United States Patent [19]

Carson

[11] 3,721,680
[45] March 20, 1973

[54] 5-AROYL-2-(β-HYDROXYETHYL)-1-LOWERALKYL-PYRROLES

[75] Inventor: John Robert Carson, Norristown, Pa.

[73] Assignee: McNeil Laboratories, Inc., Fort Washington, Pa.

[22] Filed: June 15, 1970

[21] Appl. No.: 46,519

[52] U.S. Cl.....260/326.5 J, 260/326.3, 260/326.5 S, 424/274
[51] Int. Cl. ............................................C07d 27/26
[58] Field of Search..................260/326.5 J, 326.5 S

[56] References Cited

UNITED STATES PATENTS 3,285,912  11/1966  Palopoli et al..................260/246

*Primary Examiner*—Alex Mazel
*Assistant Examiner*—Joseph A. Narcavage
*Attorney*—Salvatore R. Conte, Herbert I. Sherman and Robert L. Minier

[57] ABSTRACT

Compounds of the class of 5-aroyl-2-(β-hydroxyethyl)-1-loweralkyl-pyrroles useful as anti-inflammatory agents.

6 Claims, No Drawings

5-AROYL-2-(β-HYDROXYETHYL)-1-LOWERALKYL-PYRROLES

DESCRIPTION OF THE INVENTION

This invention relates to novel aroyl-substituted pyrroles, and, more particularly, to 5-aroyl-2-(β-hydroxyethyl)-1-loweralkyl-pyrroles of the formula:

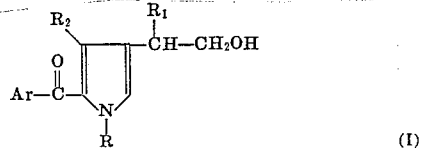

(I)

wherein R is lower alkyl, preferably methyl; $R_1$ and $R_2$ are each a member selected from the group consisting of hydrogen and lower alkyl; and Ar is a member selected from the group consisting of phenyl and phenyl substituted with one or more members selected from the group consisting of halo, lower alkyl, lower alkoxy, trifluoromethyl and methylthio. The 5-aroyl-2-(α-$R_1$-β-hydroxyethyl)-4-$R_2$-1-loweralkyl-pyrroles of formula (I) may also be denoted as 5-(2-hydroxy-1-$R_1$-ethyl)-1-loweralkyl-3-$R_2$-pyrrol-2-yl aryl ketones (aryl = Ar).

As used herein, "lower alkyl" and "lower alkoxy" may be straight or branch chained saturated hydrocarbons having from one to five carbon atoms, such as, for example, methyl, ethyl, propyl, isopropyl, butyl, pentyl and the like alkyls, and, respectively, the corresponding alkoxys, such as methoxy, ethoxy, propoxy, isopropoxy, etc.; and "halo" refers to halogens of atomic weight less than 127, i.e., fluoro, bromo, chloro and iodo.

The subject compounds (I) are obtained from the corresponding 5-aroyl-α-$R_1$-4-$R_2$-1-loweralkyl-pyrrole-2-acetic acids (II) or alkali metal salts (III) thereof, preferably the sodium salt. Said acids and salts are described in my copending U.S. patent application Ser. No. 5,958, filed Jan. 26, 1970. The acids (II) are readily converted to the salt form (III) by conventional treatment with an appropriate base such as an alkali metal hydroxide, e.g., sodium hydroxide, potassium hydroxide and the like.

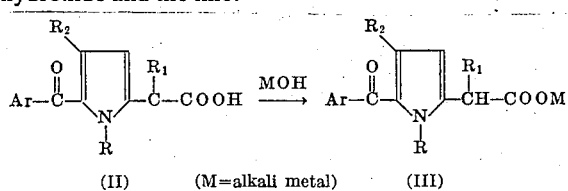

The acids (II) or alkali metal salts (III) are first converted to the corresponding acid halide form (IV), preferably the chloride, which is then treated with alkali metal borohydride, preferably sodium borohydride, in an ethereal solvent such as diglyme, dioxane, tetrahydrofuran and the like, to yield the corresponding 5-aroyl-2-(α-$R_1$-β-hydroxy-ethyl)-4-$R_2$-1-loweralkyl-pyrroles of formula (I). The conversion of the acid (II) or alkali metal salt (III) to an acid halide (IV) is readily accomplished by standard procedures in the art, for example, by treatment with oxalyl chloride or thionyl chloride. Solvents such as an aromatic hydrocarbon, e.g., benzene, toluene, xylene and the like; ethers such as ethyl ether, tetrahydrofuran, dioxane and the like; halogenated hydrocarbons such as chloroform, methylene chloride and the like; and other aprotic solvents may be employed. The foregoing reaction scheme may be illustrated as follows (the symbols R, $R_1$, $R_2$ and Ar being as heretofore described):

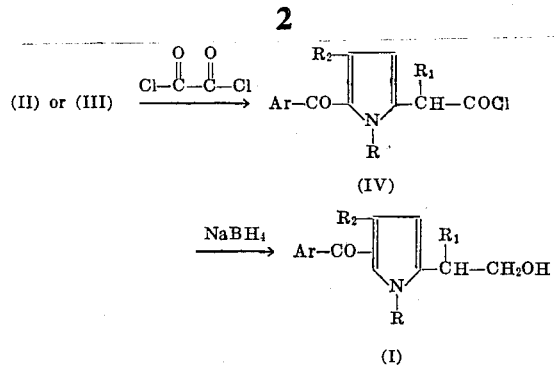

An alternative process of preparing the subject compounds (I) comprises the catalytic reduction of the acid halide (IV) over a noble metal catalyst such as palladium, platinum and the like.

The subject compounds (I) possess anti-inflammatory activity as demonstrated in the standard kaolin-induced rat paw edema test or cotton pellet granuloma test (both tests are described in the previously mentioned application Ser. No. 5,958) at doses generally ranging from about 5 to about 100 mg/kg body weight. For example, with 5-(2-hydroxyethyl)-1-methylpyrrol-2-yl p-tolyl ketone, a preferred compound of this invention, about 56 percent inhibition is observed in the kaolin induced rat paw edema assay at a dose of 25 mg/kg body weight.

Due to the available asymmetric α-carbon atom (when $R_1$ equals lower alkyl) present in the subject compounds (I), it is evident that their existence in the form of stereochemical isomers (enantiomorphs) is possible. Thus, by standard methods of resolution, or by first employing the previously resolved acid (II) in preparing the corresponding salt form (III) and then following the synthetic schemes heretofore described for making the formula (I) compounds, the corresponding (−) or (+) forms of the desired compounds will be obtained. Such pharmacologically active enantiomorphs are naturally intended to be included within the scope of this invention.

The following examples are intended to illustrate, but not to limit, the scope of the present invention.

EXAMPLE I 5-(2-Hydroxyethyl)-1-methylpyrrol-2-yl p-tolyl ketone:

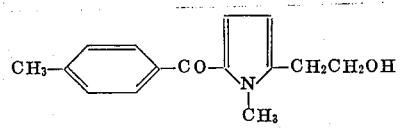

To a suspension of 20.9 g. (0.075 mole) of dry sodium 5-(p-toluoyl)-1-methylpyrrole-2-acetate, m.p. 300°–3 C. (dec.), in 200 ml. dry benzene is added 8.9 g. (0.07 mole) of oxalyl chloride in 20 ml. dry benzene over a period of 30 minutes. After 3 hours, the solid has dissolved and the solution, which is black-colored, is filtered and the solvent evaporated in vacuo to yield about 17.8 g. of a black oil comprising the acyl chloride, 5-(p-toluoyl)-1-methylpyrrole-2-acetyl chloride, which may be used without further purification in the next step.

The oil (0.065 mole approx.) is dissolved in 150 ml. of diglyme and a solution of 2.46 g. (0.065 mole) of sodium borohydride in 60 ml. of diglyme is added over a 15 minute period. The mixture is allowed to stand at room temperature for about 1 hour. Dilute hydrochloric acid is used, sufficient to decompose any excess borohydride, and the mixture is poured into water and then extracted with methylene chloride. The methylene chloride extract is dried over anhydrous magnesium sulfate and evaporated in vacuo to yield about 14.0 g. of a dark oil which is then column chromatographed on acid-washed alumina. The column is eluted successively with benzene, ether, chloroform and chloroform-ethyl acetate (1:1). The chloroform-ethyl acetate eluate containing the desired product demonstrates U.V. absorption about 250 m$\mu$. The chloroform-ethyl acetate solvent is evaporated in vacuo to yield about 7.0 g. of the product, 5-(2-hydroxyethyl)-1-methylpyrrol-2-yl p-tolyl ketone, as a yellow solid. After recrystallization from benzene and methanol, the m.p. is 122°–125° C.

Analysis.
Calc'd. for $C_{15}H_{17}NO_2$: C, 74.05; H, 7.04; N, 5.76%
Found: C, 73.87; H, 7.07; N, 5.73%

U.V. $\dfrac{CH_3OH}{\lambda_{max}}$ 255, 315 $\mu$ ($\tau$ = m$\mu$8,020, 15,500)

I.R. $\dfrac{KBr}{\gamma_{m\kappa}}$ 3620, 3000, 1610, 1600 cm$^{-1}$

EXAMPLE II

The foregoing product is also obtained by repeating the procedure of Example I but substituting an equivalent amount of the potassium salt (monohydrate, m.p. 223°–4° C.) of 5-(p-toluoyl)-1-methylpyrrole-2-acetic acid for the sodium salt used therein.

EXAMPLE III

A. The following sodium salts are obtained by conventional treatment of the corresponding acid with sodium hydroxide:
sodium 5-benzoyl-1-methylpyrrole-2-acetate;
sodium 5-benzoyl-1-ethylpyrrole-2-acetate;
sodium 5-(p-bromobenzoyl)-1-methylpyrrole-2-acetate;
sodium 5-(2',4'-dichlorobenzoyl)-1-methylpyrrole-2-acetate;
sodium 5-(3'-bromo-4'-chlorobenzoyl)-1-methylpyrrole-2-acetate;
sodium 5-(2',3',5'-tribromobenzoyl)-1-methylpyrrole-2-acetate;
sodium 5-(p-anisoyl)-1-methylpyrrole-2acetate;
sodium 5-(p-anisoyl)-1-ethylpyrrole-2-acetate;
sodium 5-(3',4',5'-trimethoxybenzoyl)-1-methylpyrrole-2-acetate;
sodium 5-(3'-chloro-p-toluoyl)-1-methylpyrrole-2-acetate;
sodium 5-(p-trifluoromethyl-benzoyl)-1-methylpyrrole-2-acetate;
sodium 5-(p-methylthiobenzoyl)-1-methylpyrrole-2-acetate; and
sodium 5-(p-isopropylbenzoyl)-1-methylpyrrole-2-acetate.

B. By following the procedure of Example I, except that an equivalent quantity of each of the foregoing sodium salts is used in place of the sodium salt employed therein and analogous chromatographic separation and purification techniques are employed, the corresponding 5-aroyl-2-($\beta$-hydroxyethyl)-1-loweralkyl-pyrroles of formula (I) are obtained as respective products.

EXAMPLE IV

1-Methyl-5-(p-trifluoromethyl-benzoyl)-pyrrole-2-acetonitrile: A solution of 14.4 g. (0.12 mole) of 1-methylpyrrole-2-acetonitrile and 25 g. (0.12 mole) of p-trifluoromethylbenzoyl chloride in 120 ml. methylene chloride is chilled to −25° C. (external bath). Then 14 ml. (0.12 mole) stannic chloride is added dropwise over a half hour. The resultant suspension is permitted to come to room temperature and then poured into ice-dilute hydrochloric acid. The aqueous phase is separated and washed successively with N,N-dimethyl-1,3-propane-diamine, 3N hydrochloric acid and a saturated solution of sodium chloride. The solvent is evaporated and the product is isolated from the residual oil by column chromatography using acid washed alumina. The solvents hexane, benzene, and ether are used as eluents. The first compound-bearing fraction not giving a positive Ehrlich's test (in benzene) is collected. The solvent is evaporated and the resultant solid, 1-methyl-5-(p-trifluoromethyl-benzoyl)-pyrrole-2-acetonitrile, is purified by recrystallization in isopropanol, m.p. 95°–97.5° C.

EXAMPLE V

1-Methyl-5-(p-trifluoromethyl-benzoyl)-pyrrole-2-acetic acid: A solution of 2.2 g. (0.0075 mole) of 1-methyl-5-(p-trifluoromethylbenzoyl)-pyrrole-2-acetonitrile, 15 ml. 95 percent ethanol and 15 ml. 1N sodium hydroxide is refluxed for 18 hours. The ethanol is evaporated. The resultant yellow solid is dissolved with water and poured into dilute hydrochloric acid. The resultant white precipitate, 1-methyl-5-(p-trifluoromethylbenzoyl)-pyrrole-2-acetic acid, is collected by filtration and purified by recrystallization in isopropanol, m.p. 152°–154° C.

Analysis.
Calc'd. for $C_{15}H_{12}F_3NO_3$: C, 57.88; H, 3.89; N, 4.50%
Found: C, 57.92; H, 4.12; N, 4.38%

EXAMPLE VI

An equivalent amount of sodium 1-methyl-5-(p-trifluoromethyl-benzoyl)-pyrrole-2-acetate (obtained by treating the acid product of Example V with sodium hydroxide) is substituted for the sodium salt precursor used in Example I to yield the following product: 2-($\beta$-hydroxyethyl)-1-methyl-5-(p-trifluoromethyl-benzoyl)-pyrrole.

EXAMPLE VII

The following sodium salts are obtained by conventional treatment of the corresponding acid with sodium hydroxide:
sodium 5-(p-chlorobenzoyl)-$\alpha$-methyl-1-methylpyrrole-2-acetate;
sodium 5-benzoyl-$\alpha$-(n-butyl)-1-methylpyrrole-2-acetate;
sodium 5-(p-methoxybenzoyl)-$\alpha$-methyl-1-methylpyrrole-2-acetate;
sodium 5-(p-methylbenzoyl)-$\alpha$-ethyl-1-methylpyrrole-2-acetate;
sodium 5-(2',4'-dichlorobenzoyl)-$\alpha$-methyl-1-methylpyrrole-2-acetate;
sodium 5-(3'-chloro-4'-methylbenzoyl)-$\alpha$-ethyl-1-methylpyrrole-2-acetate;

sodium 5-(p-chlorobenzoyl)-α-methyl-1-ethylpyrrole-2-acetate;
sodium 5-benzoyl-α-methyl-1-ethylpyrrole-2-acetate;
sodium 5-(p-methylbenzoyl)-α-ethyl-1-(n-propyl)pyrrole-2-acetate;
sodium 5-(2',4'-dichlorobenzoyl)-α-methyl-1-(n-butyl)pyrrole-2-acetate;
sodium 5-(p-chlorobenzoyl)-1,4-dimethylpyrrole-2-acetate;
sodium 5-(p-toluoyl)-1,4-dimethylpyrrole-2-acetate;
sodium 5-benzoyl-1,4-dimethylpyrrole-2-acetate;
sodium 5-(2',3',5'-tribromobenzoyl)-1,4-dimethylpyrrole-2-acetate;
sodium 5-(p-methylthiobenzoyl)-1,4-dimethylpyrrole-2-acetate;
sodium 5-(p-trifluoromethylbenzoyl)-1,4-dimethylpyrrole-2-acetate;
sodium 5-(3',4'-dimethoxybenzoyl)-1,4-dimethylpyrrole-2-acetate;
sodium 5-(p-chlorobenzoyl)-4-ethyl-1-methylpyrrole-2-acetate;
sodium 5-benzoyl-4-ethyl-1-methylpyrrole-2-acetate;
sodium 5-(p-chlorobenzoyl)-1,4-diethylpyrrole-2-acetate;
sodium 5-(p-methylthiobenzoyl)-1-butyl-4-ethylpyrrole-2-acetate;
sodium 5-(3',4'-dimethoxybenzoyl)-4-butyl-1-methylpyrrole-2-acetate;
sodium 5-(p-chlorobenzoyl)-1,4,α-trimethylpyrrole-2-acetate;
sodium 5-(p-tluoyl)-(p-toluoyl)-,α-trimethylpyrrole-2-acetate;
sodium 5-benzoyl-1,4,α-trimethylpyrrole-2-acetate;
sodium 5-(p-ethoxybenzoyl)-1,4,α-trimethylpyrrole-2-acetate;
sodium 5-(2',4'-dimethoxybenzoyl)-1,4,α-trimethylpyrrole-2-acetate;
sodium 5-(2',3',5'-tribromobenzoyl)-1,4,α-trimethylpyrrole-2-acetate; and
sodium 5-(p-chlorobenzoyl)-4-ethyl-1,α-dimethylpyrrole-2-acetate.

EXAMPLE VIII

The procedure of Example I is followed, except that an equivalent quantity of each of the sodium salts obtained in Example VII is used in place of the sodium salt precursor employed therein, and analogous chromatographic separation and purification techniques are employed, to yield as respective products the corresponding 5-aroyl-2-(α-$R_1$-β-hydroxy-ethyl)-4-$R_2$-1-loweralkyl-pyrroles of formula I.

EXAMPLE IX

Ethyl 5-(p-chlorobenzoyl)-1-methylpyrrole-2-acetate: To a solution of 22.0 g. (0.131 mole) of ethyl N-methylpyrrole-2-acetate and 24.5 g. (0.14 mole) of p-chlorobenzoyl chloride in 120 ml. of carbon disulfide is added 35.0 g. (0.262 mole) of anhydrous aluminum chloride over a period of 20 minutes with intermittant cooling to keep the temperature at 25° C. The mixture is stirred for an additional 20 minutes. The carbon disulfide solvent is then decanted and discarded. The red gummy residue is washed with hexane and dilute hydrochloric acid and ice is added to the mixture. The mixture is extracted with ether. The ether solution is shaken with an aqueous solution of dimethylaminopropylamine and washed with dilute hydrochloric acid followed by brine. The solution is dried over magnesium sulfate and treated with charcoal. After removal of the charcoal, the solvent is evaporated in vacuo leaving a partially crystalline red oil as a residue. This material is extracted with three 500 ml. portions of boiling pentane. The combined pentane extracts are evaporated in vacuo and the residue is crystallized from 60 ml. of cold methanol. The resulting solid is collected and washed with cold methanol; there is obtained about 6.3 g. of white crystalline solid, ethyl 5-(p-chlorobenzoyl)-1-methylpyrrole-2-acetate, m.p. 74°–76° C. Recrystallization from methyl cyclohexane raises the melting point to 78°–80 C.

EXAMPLE X 5-(p-Chlorobenzoyl)-1-methylpyrrole-2-acetic acid and its sodium salt: A suspension of 3.06 g. (0.01 mole) of ethyl-5-(p-chlorobenzoyl)-1-methylpyrrole-2-acetate in 25 ml. of 0.5 N sodium hydroxide is refluxed for 30 minutes. About two-thirds of this solution is cooled, washed with ether, and then acidified with dilute hydrochloric acid. The resulting solid precipitate is collected by filtration, dried and recrystallized from ethanol-water to give the product, 5-(p-chlorobenzoyl)-1-methylpyrrole-2-acetic acid; m.p. 189°–191° C. Upon recrystallization from ethanol-water, the melting point is 188°–190° C. The other one-third of the solution is cooled in an ice-bath whereupon the yellow sodium salt of the acid is precipitated and collected by filtration.
Analysis:
Calcd. for $C_{14}H_{12}ClNO_3$: C, 60.54; H, 4.36; N, 5.05%
Found: C, 60.54; H, 4.37; N, 5.14%

EXAMPLE XI

The procedure of Example I is followed, except that an equivalent of sodium 5-(p-chlorobenzoyl)-1-methylpyrrole-2-acetate is substituted for the sodium salt precursor used therein and analagous chromatographic separation and purification techniques are employed, to yield as the respective product: 5-(p-chlorobenzoyl)-2-(β-hydroxyethyl)-1-methylpyrrole.

EXAMPLE XII

Ethyl 1,4-dimethyl-5-(p-fluorobenzoyl)-pyrrole-2-acetate: A solution of 3.95 g. (0.025 mole) of p-fluorobenzoyl chloride and 3.32 g. (0.025 mole) of aluminum chloride in 20 ml. of 1,2-dichloroethane is added dropwise to a solution of 4.52 g. (0.025 mole) of ethyl 1,4-dimethylpyrrole-2-acetate in 20 ml. of 1,2-dichloroethane at room temperature. The reaction mixture is stirred for 2 hrs. and then cooled and poured into ice-dilute HCl. The organic phase is separated and washed successively with N,N-dimethyl-1,3-propanediamine, dilute hydrochloric acid and a saturated solution of sodium chloride; dried over anhydrous magnesium sulfate; and the solvent evaporated. The residue is triturated with hot hexane and crystals form upon cooling. There is obtained about 1.9 g. (25 percent yield) of ethyl 1,4-dimethyl-5-

(p-fluorobenzoyl)-pyrrole-2-acetate as a white solid, m.p. 84°–86° C. Upon recrystallization from methanol, the m.p. is 87°–89° C.

EXAMPLE XIII 1,4-Dimethyl-5-(p-fluorobenzoyl)-pyrrole-2-acetic acid: A suspension of 3.03 g. (0.01 mole) of ethyl 1,4-dimethyl-5-(p-fluorobenzoyl-pyrrole-2-acetate in 11 ml. of 1N sodium hydroxide solution is heated under reflux for 30 min. The solution is filtered while hot and acidified with dilute hydrochloric acid. The precipitate is collected, air dried and recrystallized from 2-propanol to give about 2.5 g. (91 percent yield) of 1,4-dimethyl-5-(p-fluorobenzoyl)-pyrrole-2-acetic acid as a white solid, m.p. 176°–178° C.

EXAMPLE XIV

The procedure of Example I is followed, except that an equivalent amount of sodium 1,4-dimethyl-5-(p-fluorobenzoyl)-pyrrole-2-acetate (obtained by treating the acid product of Example XIII with sodium hydroxide) is substituted for the sodium salt precursor used therein and analogous chromatographic separation and purification techniques are employed, to yield as the respective product: 5-(p-fluorobenzoyl)-2-($\beta$-hydroxyethyl)-1,4-dimethylpyrrole.

I claim:

1. A 5-aroyl-2-($\beta$-hydroxyethyl)-1-loweralkyl-pyrrole having the formula:

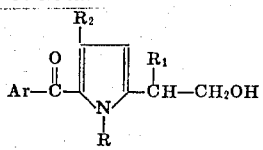

wherein R is lower alkyl; $R_1$ and $R_2$ are each a member selected from the group consisting of hydrogen and lower alkyl; and Ar is a member selected from the group consisting of phenyl and mono-, di- and tri-substituted phenyl, the substituent of such substituted phenyl being one or more members selected from the group consisting of halo, lower alkyl, lower alkoxy, trifluoromethyl and methylthio.

2. A 5-aroyl-2-($\beta$-hydroxyethyl)-1-methylpyrrole having the formula:

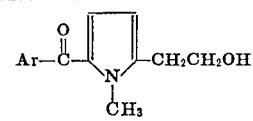

wherein Ar is a member selected from the group consisting of phenyl and mono-, di- and tri-substituted phenyl, the substituent of such substituted phenyl being one or more members selected from the group consisting of halo, lower alkyl, lower alkoxy, trifluoromethyl and methylthio.

3. 5-(2-Hydroxyethyl)-1-methylpyrrol-2-yl p-tolyl ketone.

4. 5-(p-chlorobenzoyl)-2-($\beta$-hydroxyethyl)-1-methylpyrrole.

5. 2-($\beta$-hydroxyethyl)-1-methyl-5-(p-trifluoromethyl-benzoyl)-pyrrole.

6. 5-(p-Fluorobenzoyl)-2-($\beta$-hydroxyethyl)-1,4-dimethylpyrrole.

* * * * *

UNITED STATES PATENT OFFICE
CERTIFICATE OF CORRECTION

Patent No. 3,721,680                           Dated  March 20, 1973

Inventor(s)   John Robert Carson

It is certified that error appears in the above-identified patent and that said Letters Patent are hereby corrected as shown below:

Column 5, line 33, "sodium 5-(p-tluoyl)-(p-toluoyl)" should read -- sodium 5-(p-toluoyl)-1,4 --.

In Column 6, line 43, " an equivalent of sodium" should read --- an equivalent amount of sodium ---.

Signed and sealed this 1st day of January 1974.

(SEAL)
Attest:

EDWARD M. FLETCHER, JR.　　　　　　RENE D. TEGTMEYER
Attesting Officer　　　　　　　　　Acting Commissioner of Patents